(12) United States Patent
Ungerer et al.

(10) Patent No.: US 9,028,654 B2
(45) Date of Patent: May 12, 2015

(54) METHOD OF TREATMENT OF AMINE WASTE WATER AND A SYSTEM FOR ACCOMPLISHING THE SAME

(75) Inventors: Bjoern Ungerer, Bad Schoenborn (DE); Christoph Weingaertner, Gaualgesheim (DE); Hans-Peter Dornik, Oberramstadt (DE)

(73) Assignee: ALSTOM Technology Ltd, Baden (CH)

( * ) Notice: Subject to any disclaimer, the term of this patent is extended or adjusted under 35 U.S.C. 154(b) by 469 days.

(21) Appl. No.: 13/408,683

(22) Filed: Feb. 29, 2012

(65) Prior Publication Data

US 2013/0220792 A1    Aug. 29, 2013

(51) Int. Cl.
*B01D 1/06* (2006.01)
*C02F 1/04* (2006.01)
(Continued)

(52) U.S. Cl.
CPC . *C02F 1/048* (2013.01); *B01D 1/06* (2013.01); *B01D 1/28* (2013.01); *B01D 61/022* (2013.01); *C02F 1/441* (2013.01); *C02F 2101/38* (2013.01); *C02F 2103/18* (2013.01); *B01D 2311/04* (2013.01); *B01D 2311/25* (2013.01); *B01D 3/145* (2013.01)

(58) Field of Classification Search
CPC ............ B01D 1/06; B01D 1/28; B01D 61/02; B01D 61/022; B01D 61/04; B01D 2311/04; B01D 2311/25; B01D 2311/2669; B01D 2311/2673; C02F 1/04; C02F 1/041; C02F 1/048; C02F 1/441; C02F 2101/38; C02F 2103/18
USPC ............. 202/177, 185.1, 237; 203/10, 12, 14, 203/24, 39, 61; 159/24.2, 28.5, 47.3; 210/652, 257.2, 294, 295, 322, 903
See application file for complete search history.

(56) References Cited

U.S. PATENT DOCUMENTS 2,487,576 A    11/1949  Meyers
2,608,461 A    8/1952   Frazier
(Continued)

FOREIGN PATENT DOCUMENTS

DE    10325230 A1    12/2004
EP    0 502 596      9/1992
(Continued)

OTHER PUBLICATIONS

International Search Report and the Written Opinion of the International Searching Authority, mailed Jul. 2, 2013 (PCT/IB2013/051608).

*Primary Examiner* — Nina Bhat
*Assistant Examiner* — Jonathan Miller
(74) *Attorney, Agent, or Firm* — Cynthia W. Flanigan

(57) ABSTRACT

Disclosed herein is a system comprising an evaporation unit comprising a first heat exchanger in fluid communication with a second heat exchanger; where the first heat exchanger is operative to heat an effluent stream comprising an amine solvent and/or amine byproducts and water and to discharge the effluent stream to the second heat exchanger; where the second heat exchanger is operative to convert the effluent stream into a distillate stream and a concentrate stream; and a reverse osmosis unit in fluid communication with the evaporation unit; where the reverse osmosis unit comprises a first reverse osmosis unit that is operative to receive the distillate stream and to separate water from byproducts of the amine solvent such that the water has a purity of greater than 95%, based on the weight of the distillate stream.

20 Claims, 1 Drawing Sheet

(51) Int. Cl.
  *B01D 61/02* (2006.01)
  *B01D 1/28* (2006.01)
  *C02F 1/44* (2006.01)
  *B01D 3/14* (2006.01)
  *C02F 101/38* (2006.01)
  *C02F 103/18* (2006.01)

(56) References Cited

U.S. PATENT DOCUMENTS

| | | | |
|---|---|---|---|
| 3,255,233 A | | 6/1966 | Kunze et al. |
| 3,563,696 A | | 2/1971 | Benson |
| 3,632,505 A | * | 1/1972 | Nelson .......... 210/652 |
| 3,896,212 A | | 7/1975 | Eickmeyer |
| 4,344,826 A | * | 8/1982 | Smith .............. 203/2 |
| 5,269,933 A | * | 12/1993 | Jehle et al. ........ 210/640 |
| 5,284,589 A | * | 2/1994 | Tegtmeyer et al. ...... 210/641 |
| 5,318,758 A | | 6/1994 | Fujii et al. |
| 5,344,627 A | | 9/1994 | Fujii et al. |
| 5,378,442 A | | 1/1995 | Fujii et al. |
| 5,618,506 A | | 4/1997 | Suzuki et al. |
| 6,117,404 A | | 9/2000 | Mimura et al. |
| 6,379,548 B1 | * | 4/2002 | Kurokawa et al. ...... 210/631 |
| 6,423,282 B1 | | 7/2002 | Araki et al. |
| 6,485,547 B1 | | 11/2002 | Iijima |
| 6,645,446 B1 | | 11/2003 | Won et al. |
| 6,716,352 B1 | | 4/2004 | Livingston |
| 6,764,530 B2 | | 7/2004 | Iijima |
| 6,800,120 B1 | | 10/2004 | Won et al. |
| 6,883,327 B2 | | 4/2005 | Iijima et al. |
| 7,056,482 B2 | | 6/2006 | Hakka et al. |
| 7,316,737 B2 | | 1/2008 | Mimura et al. |
| 7,377,967 B2 | | 5/2008 | Reddy et al. |
| 7,681,643 B2 | * | 3/2010 | Heins ............ 166/266 |
| 8,460,553 B2 | * | 6/2013 | Burke et al. ........ 210/651 |
| 2004/0226441 A1 | | 11/2004 | Palmer |
| 2006/0204425 A1 | | 9/2006 | Kamijo et al. |
| 2006/0248890 A1 | | 11/2006 | Iijima et al. |
| 2008/0056972 A1 | | 3/2008 | Iijima |
| 2008/0072762 A1 | | 3/2008 | Gal |
| 2008/0223215 A1 | | 9/2008 | Iijima et al. |
| 2009/0068078 A1 | | 3/2009 | Grobys et al. |
| 2009/0188867 A1 | | 7/2009 | Vuong et al. |
| 2009/0305870 A1 | | 12/2009 | Chung |
| 2010/0003177 A1 | | 1/2010 | Aroonwilas et al. |
| 2010/0005722 A1 | | 1/2010 | Iijima et al. |
| 2010/0050637 A1 | | 3/2010 | Yamashita et al. |
| 2010/0258005 A1 | | 10/2010 | Oishi et al. |
| 2010/0326074 A1 | | 12/2010 | Okita et al. |
| 2011/0033359 A1 | | 2/2011 | Papenheim et al. |
| 2011/0100917 A1 | | 5/2011 | Rhee et al. |
| 2011/0308389 A1 | | 12/2011 | Graff et al. |

FOREIGN PATENT DOCUMENTS

| | | |
|---|---|---|
| EP | 0 879 631 | 5/2002 |
| EP | 1 695 756 | 8/2006 |
| EP | 2 085 133 | 8/2009 |
| EP | 2 258 461 | 12/2010 |
| EP | 2 269 711 | 1/2011 |
| EP | 2 269 712 | 1/2011 |
| EP | 2 269 713 | 1/2011 |
| EP | 2 286 894 | 2/2011 |
| FR | 2 938 454 | 2/2010 |
| GB | 871207 | 6/1961 |
| JP | 2010036094 A | 4/2004 |
| JP | 2009214089 | 9/2009 |
| JP | 2009215186 | 9/2009 |
| WO | WO 02/09849 | 2/2002 |
| WO | WO 03/013699 | 2/2003 |
| WO | WO 2004/005818 | 1/2004 |
| WO | WO 2005/069965 | 8/2005 |
| WO | WO 2007/009461 | 1/2007 |
| WO | WO 2007/019632 | 2/2007 |
| WO | WO 2007/068733 | 6/2007 |
| WO | WO 2007/107004 | 9/2007 |
| WO | WO 2008/094777 | 8/2008 |
| WO | WO 2009/003238 | 1/2009 |
| WO | WO 2009/004307 | 1/2009 |
| WO | WO 2009/035340 | 3/2009 |
| WO | WO 2009/065218 | 4/2009 |
| WO | WO 2009/104744 | 8/2009 |
| WO | WO 2009/112518 | 9/2009 |
| WO | WO 2010/010720 | 1/2010 |
| WO | WO 2010/051604 | 5/2010 |
| WO | WO 2010/102877 | 9/2010 |
| WO | WO 2010/105754 | 9/2010 |
| WO | WO 2010/113364 | 10/2010 |
| WO | WO 2010/122830 | 10/2010 |
| WO | WO 2010133484 | 11/2010 |
| WO | WO 2010/142716 | 12/2010 |

\* cited by examiner

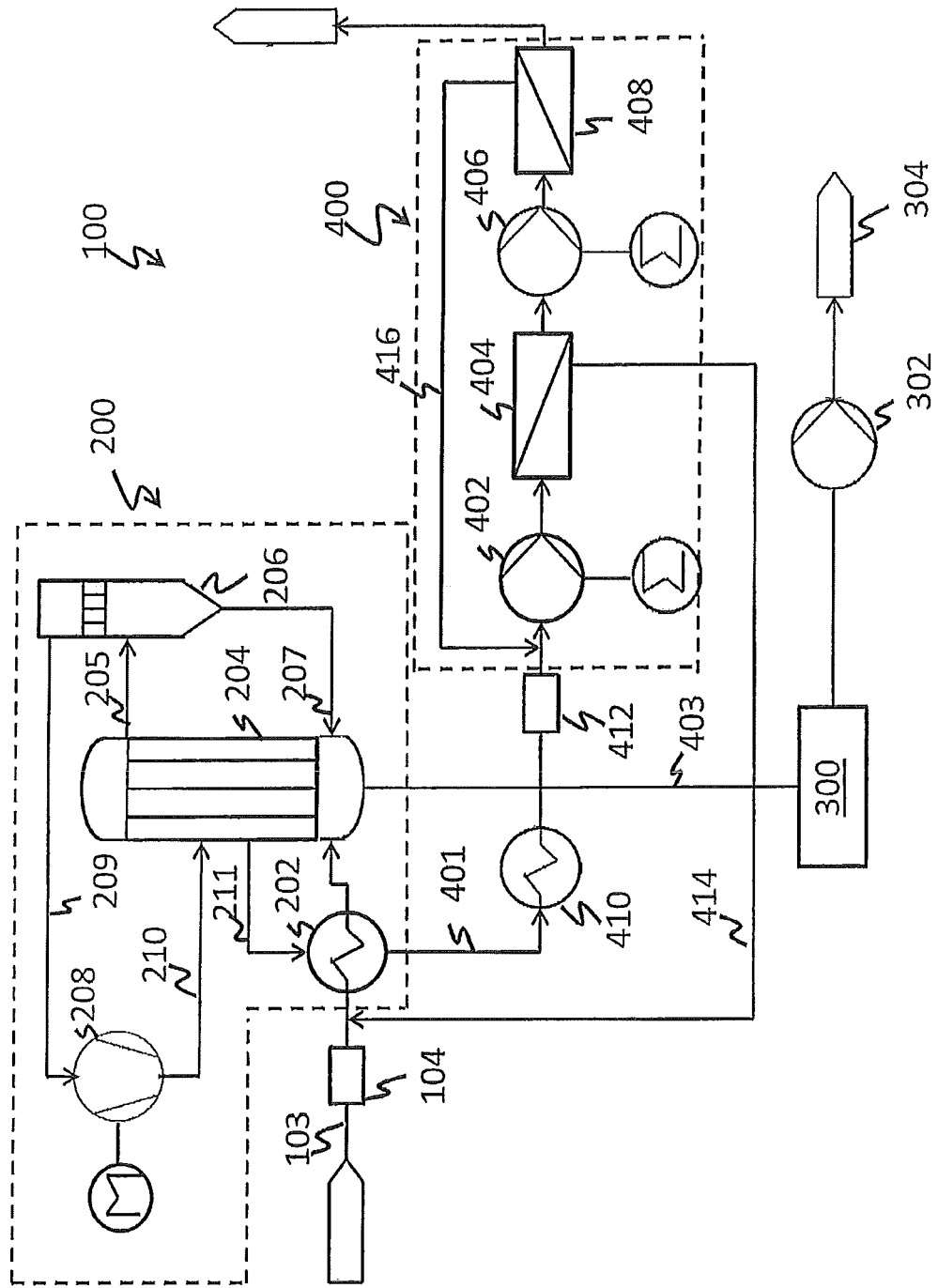

METHOD OF TREATMENT OF AMINE WASTE WATER AND A SYSTEM FOR ACCOMPLISHING THE SAME

FIELD OF THE INVENTION

This disclosure is related to methods of treatment of waste water containing amines. In particular, this disclosure is related to methods of treatment of waste water containing amines where the waste water is obtained from an amine based post combustion carbon dioxide capture plant.

BACKGROUND OF THE INVENTION

The combustion of a fuel, such as coal, oil, peat, waste, and the like, in a combustion plant such as a power plant, generates a hot process gas stream known as a flue gas stream. In general, the flue gas stream contains particulates and gaseous contaminants such as carbon dioxide ($CO_2$). The negative environmental effects of releasing $CO_2$ to the atmosphere have been recognized, and have resulted in the development of processes adapted for removing or reducing the amount of $CO_2$ from the flue gas streams. One such system and process is directed to the utilization of amine-containing solutions. Amine-containing solutions can efficiently remove $CO_2$, as well as other contaminants, such as sulfur dioxide and hydrogen chloride, from a flue gas stream.

Treatment of the flue gas stream with amine-containing solutions results in an effluent stream that may be regenerated and recirculated throughout the system. However, there are often degradation products produced by the reactions between the amine-containing solution and the contaminants present in the flue gas stream. Those degradation products should be removed as they impact the ability and the effectiveness of the regenerated and recirculated amine-containing solutions to absorb $CO_2$.

To safeguard the efficiency of the system, and to comply with emission standards, treatment or removal of the degradation products from the system is desired.

SUMMARY

Disclosed herein is a system comprising an evaporation unit comprising a first heat exchanger in fluid communication with a second heat exchanger; where the first heat exchanger is operative to heat an effluent stream comprising an amine solvent or byproducts of the amine solvent and water and to discharge the effluent stream to the second heat exchanger; where the second heat exchanger is operative to convert the effluent stream into a distillate stream and a concentrate stream; and a reverse osmosis unit in fluid communication with the evaporation unit; where the reverse osmosis unit comprises a first reverse osmosis unit that is operative to receive the distillate stream and to separate water from byproducts of the amine solvent such that the water has a purity of greater than 95%, based on the weight of the distillate stream.

Disclosed herein too is a method comprising discharging an effluent stream comprising an amine solvent or byproducts of the amine solvent and water to a first heat exchanger; heating the effluent stream in the first heat exchanger; discharging the effluent stream from the first heat exchanger to the second heat exchanger; separating the effluent stream into a distillate stream and a concentrate stream; discharging the distillate stream to a reverse osmosis unit that comprises a first reverse osmosis unit; and separating the water from amine byproducts in the first reverse osmosis unit; where the water has a purity of greater than 95%, based on the total weight of the distillate stream.

BRIEF DESCRIPTION OF THE FIGURES

FIG. 1 is a depiction of an exemplary system that is used to separate water from an effluent stream containing amines and amine byproducts.

DETAILED DESCRIPTION

Amine based post-combustion processes produce different types of amine containing waste waters (hereinafter "effluents") due to the degradation of amines, undesirable accumulation of amines in wash systems, backwash of filters and purges, and the like. These effluents are further treated to avoid expensive external treatment. Systems have been designed and developed to remove amines and their byproducts from effluent streams. Some of these waste water treatment systems remove amines to a certain level, but are insufficient to effectively remove substantially all of the amines and their byproducts from the waste water streams.

Disclosed herein is a system and a method for treating an amine containing waste water stream. The system advantageously comprises an evaporation unit in fluid communication with a reverse osmosis unit. Effluents discharged from the plant are discharged to the evaporation unit to produce a concentrate, which is then safely disposed of. The evaporation unit advantageously removes anions, cations, salts and other solids in the range of about 95 to about 99% from the effluent. The reverse osmosis system can be a single pass or double pass cell and advantageously removes about 95 to about 99% of the amines present in the effluent.

The FIG. 1 discloses a system 100 that comprises an evaporation unit 200 in fluid communication with a concentrate storage unit 300 and a reverse osmosis unit 400. Both the concentrate storage unit 300 and the reverse osmosis unit 400 are located downstream of the evaporation unit 200. In one embodiment, the evaporation unit 200 also lies upstream of the reverse osmosis unit 400. In other words, the evaporation unit 200 and the reverse osmosis unit 400 are lie a recycle loop—products discharged from the evaporation unit 200 are discharged to the reverse osmosis unit 400 and products discharged from the reverse osmosis unit 400 are discharged to the evaporation unit 200.

With reference now once again to the FIG. 1, the evaporation unit 200 comprises a first heat exchanger 202 in fluid communication with a second heat exchanger 204, a water separator 206 and a compressor 208. In one embodiment, the heat exchanger 202 is in a recycle loop with the second heat exchanger 204, i.e., the second heat exchanger 204 lies upstream and downstream of the first heat exchanger 202. In another embodiment, the second heat exchanger 204 lies in a recycle loop with the water separator 206, i.e., the second heat exchanger 204 lies upstream and downstream of the water separator 206. In yet another embodiment, the second heat exchanger 204 is also in a recycle loop with the water separator 206 via the compressor 208, i.e., the compressor 208 lies upstream and downstream of the water separator 206. In an exemplary embodiment, the evaporation unit 200 is an electrically driven mechanical vapor recompression (MVR) evaporator comprising a feed distillate heat exchanger 202 (the first heat exchanger), a shell and tube heat exchanger 204 (the second heat exchanger 204), a water separator 206 and a compressor 208. Additional details of the evaporation unit 200 are provided below.

The reverse osmosis unit 400 comprises a first optional pump 402 in fluid communication with a first reverse osmosis unit 404. A first recycle loop 414 discharges the retentate from the first reverse osmosis unit 404 to an effluent stream 103 at a point upstream of the pump 202. This retentate comprises water and amine solution byproducts. An optional second pump 406 and an optional second reverse osmosis unit 408 lie downstream of the first reverse osmosis unit 404 and are in fluid communication with the first reverse osmosis unit 404. The second reverse osmosis unit 408, if present, lies downstream of the second pump 406. A second recycle loop 416 recycles the retentate from the second reverse osmosis unit 408 to the evaporation distillate stream 401 at the inlet of the first reverse osmosis unit 404.

As detailed above, power generation facilities generate a flue gas stream that contains carbon dioxide. The carbon dioxide is removed from the flue gas stream in a carbon capture system. The removal of carbon dioxide from the flue gas stream in the carbon capture system generates a stream of carbon dioxide that is released from the carbon capture system for further use or storage (not shown). Removal of carbon dioxide from the flue gas stream also generates a cleaned flue gas stream. The cleaned flue gas stream may be released to the atmosphere via a stack (not shown) or sent to another section of the system for further processing and/or treatment (not shown).

Using an amine-containing solution to remove carbon dioxide from the flue gas stream results in the formation of an effluent stream 103 (see FIG. 1) that contains products from the degradation of the amine-containing solution, residual amines and other compounds that reduce the efficacy and efficiency of the amine-containing solution when it is regenerated for re-use within the carbon capture system. The effluent stream 103 contains amines (primary, secondary and/or tertiary), aldehydes, amides, nitrosamines, anions, cations, other solids in addition to water. As noted above, it is desirable to treat the waste water stream 103 to remove substantially all of the amines (primary, secondary and/or tertiary), aldehydes, amides, nitrosamines, anions, cations, other solids (hereinafter also referred to as "contaminants").

With respect to the FIG. 1, the effluent stream 103 is first contacted with an acid in a dosing system 104, where the acid is operative to adjust the pH of the effluent stream to about 5 to about 9. In addition to reducing the pH, the addition of the acid to the effluent stream 103 produces salt and water and also results in an improvement of the amine and aldehyde removal efficiency from the effluent stream 103. The effluent stream 103 is then discharged from the dosing system 104 at a temperature of about 40 to about 50° C. to the evaporation unit 200 where it is introduced into the first heat exchanger 202. The evaporation unit 200 facilitates the evaporation of amine containing effluents.

In an exemplary embodiment, the first heat exchanger 202 is a feed distillate heat exchanger. The first heat exchanger 202 exchanges heat between the effluent stream and a distillate stream 401 emanating from the second heat exchanger 204. The effluent stream enters the first heat exchanger at a temperature of about 40 to about 50° C. and absorbs heat from the distillate stream 401 that has a temperature of about 85 to about 90° C.

The second heat exchanger 204 can be either a steam driven type or an electrical driven type. Examples of the second heat exchanger 204 are a shell and tube heat exchanger, plate heat exchanger, adiabatic wheel heat exchanger, plate fin heat exchanger, pillow plate heat exchanger, dynamic scraped surface heat exchanger or a phase-change heat exchanger. One or more of these heat exchangers may be used if desired. As noted above, an exemplary second heat exchanger 204 is a tube and shell heat exchanger.

The second heat exchanger 204 receives the effluent stream 103 from the first heat exchanger 202 at a temperature of about 70 to about 80° C. The second heat exchanger 204 facilitates the separation of the water from the contaminants (amines (primary, secondary and/or tertiary), aldehydes, amides, nitrosamines, anions, cations, other solids) in the effluent stream 103 by evaporation. A wet steam stream 205 leaves the second heat exchanger 204 and is guided to a water separator 206. The water separator 206 separates residual water from the steam. A (separated) water stream 207 recirculated to the second heat exchanger 204. A dry steam stream 209 leaves the water separator 206 and enters a compressor 208. The compressor 208 delivers the required energy for evaporation of effluent stream 103 and ensures the desired circulation. A steam stream 210 leaves the compressor 208 and is guided to the second heat exchanger 204. In the second heat exchanger 204, the steam stream 210 is condensed to a distillate stream 211 and guided to the first heat exchanger 202, transferring the heat to the effluent stream 103. The water leaves the first heat exchanger 202 as the evaporation distillate stream 401 (hereinafter the distillate stream), while the contaminants leave the second heat exchanger 204 as a concentrate stream 403. Both of these streams will be addressed in detail below.

The second heat exchanger 204 is in fluid communication with the water separator 206 and the compressor 208. Steam is the heating medium used in the second heat exchanger 204. The water separator 206 receives the wet steam stream 205 from the second heat exchanger 204 at a temperature of about 85° C. to about 95° C. The wet steam stream 205 entering the water separator 206 is separated into vapor and liquid. The water separator 206 contains a demister. The vapor is discharged from the top of the water separator 206 to the compressor 208 as the dry steam stream 209 and recycled to the second heat exchanger 204, while the water is discharged from the bottom of the water separator 206 to the second heat exchanger 204 as the separated water stream 207.

The first heat exchanger 202 receives the distillate stream 211 from the second heat exchanger 204. As noted above, it exchanges this heat with the effluent stream 103 raising the temperature of the effluent stream 103 prior to its entry to the second heat exchanger 204 in the process.

The distillate stream 211 (now identified as 401 but having essentially the same composition as stream 211) leaving the first heat exchanger 202 is discharged to the reverse osmosis unit 400, while the concentrate stream 403, which contains those contaminants extracted from the effluent stream is discharged to the concentrate storage tank 300.

The distillate stream 401 is directed to reverse osmosis unit 400 via an optional heat exchanger 410 and a second dosing unit 412. The optional heat exchanger 410 reduces the temperature of the distillate stream if desired, while the second dosing unit 412 introduces additional acid into the distillate stream 401. The optional heat exchanger 410 is employed to reduce the temperature of the distillate stream 403 to minimize damage to the membranes employed in the reverse osmosis unit 400. The addition of acid converts amines and neutralizes other basic ingredients into salts, which are more easily separated from the distillate stream than the amines.

Acids used in the dosing units 104 and 412 can be any type of acids. A suitable example of an acid is a mineral acid. Examples of such acids are sulfuric acid, nitric acid, hydrochloric acid, acetic acid, citric acid, carbonic acid, phosphoric acid, oxalic acid, or the like, or a combination comprising at least one of the foregoing acids. An exemplary acid for purposes of dosing the effluent stream 103 or the distillate stream 401 is sulfuric acid.

The distillate stream 401 is pumped via a pump 402 into the first reverse osmosis unit 404. Reverse osmosis (RO) is a membrane-technology filtration method that removes many types of large molecules and ions from solutions by applying pressure to the solution when it is on one side of a selective membrane. The result is that the solute is retained on the pressurized side of the membrane and the pure solvent is allowed to pass to the other side. To be "selective," this membrane should not allow large molecules or ions through the pores (holes), but should allow smaller components of the solution (such as the solvent) to pass freely.

Suitable membranes for the first reverse osmosis unit 404 are aromatic polyamide membranes or thin film composite type membranes that include aromatic polyamides. The distillate stream 401 is pressurized to a suitable desired pressure prior to entry into the first reverse osmosis unit 404 or during the operation of the first reverse osmosis unit 404. The pressure varies depending upon the type of membrane and the desired recovery rate. The temperature of the distillate stream 401 prior to entry into the first reverse osmosis unit 404 is about 50 to about 60° C.

The solute from the first reverse osmosis unit 404 is recycled to the effluent stream 103 via stream 414. In one embodiment, water obtained from the distillate stream 401 after being separated from the solute in the first reverse osmosis unit 404 is substantially free from impurities and can be used as make up water for a carbon capture plant or for a power plant. In one embodiment, the water obtained after the first reverse osmosis unit 404 is about 95 to about 99.9% free of amine based impurities, based on the total weight of the distillate stream 401.

In another embodiment, the stream of fluid emanating from the first reverse osmosis unit 404 may need to be subjected to a second reverse osmosis process. The second reverse osmosis unit 408 is arranged in series with the first reverse osmosis unit 404 and lies downstream of it. A second optional pump 406 can be used to pressurize the fluid emanating from the first reverse osmosis unit 404. The pressure of the fluid prior to entering the second reverse osmosis unit or during the operation of the second reverse osmosis unit is dependent on the type of membrane and the desired recovery rate. The temperature of the fluid prior to entering the second reverse osmosis unit is about 50 to about 60° C.

In order to facilitate purifying the water in the distillate stream to the maximum content possible, the solute (also termed the retentate) from the second reverse osmosis unit 408 may be optionally recirculated back to the distillate stream 401 upstream of the pump 402. The reverse osmosis unit 400 can thus be utilized as a multi-array double pass reverse osmosis unit. The water obtained from the second reverse osmosis unit 408 has a purity of greater than 97%, specifically greater than 99% and more specifically greater than 99.9%, based on the total weight of the distillate stream 401. As noted above, the water obtained by this method of separating amines and their byproducts from the water may be reutilized in a carbon capture plant or in a power plant.

The contaminants (hereinafter termed the "concentrate") are discharged from the second heat exchanger 204 to the concentrate storage tank 300 as the concentrate stream 403. From the concentrate storage tank 300 they are optionally pumped by a pump 302 to a disposal facility 304. From the concentrate storage tank 300, the solids may be disposed of by an external recycling company or alternatively, the concentrate may be used for co-incineration in a boiler of the combustion plant.

This method of removing water from an effluent stream containing amines is advantageous in that the water is purified to greater than 97%, specifically to greater than 99.9%, based on the total weight of the distillate stream. No waste streams are emitted to the environment. The process is also inexpensive and efficient.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term and/or is used herein to mean both "and" as well as "or". For example, "A and/or B" is construed to mean A, B or A and B.

The transition term "comprising" is inclusive of the transition terms "consisting essentially of" and "consisting of" and can be interchanged for "comprising".

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method comprising:
   discharging an effluent stream comprising an amine solvent or byproducts of the amine solvent and water to a first heat exchanger;
   heating the effluent stream in a first heat exchanger;
   discharging the effluent stream from the first heat exchanger to a second heat exchanger;
   producing a wet steam stream in the second heat exchanger;
   separating the wet steam stream into a vapor and a liquid and returning the liquid to the second heat exchanger;
   compressing the vapor and returning it to the second heat exchanger;
   separating the effluent stream into a distillate stream and a concentrate stream;
   discharging the distillate stream to a reverse osmosis unit that comprises a first reverse osmosis unit; and
   separating the water from amine byproducts in the first reverse osmosis unit; where the water has a purity of greater than 95%, based on the total weight of the distillate stream.

2. The method of claim 1, further comprising discharging the concentrate stream to a concentrate storage tank.

3. The method of claim 1, further comprising separating water from amine byproducts in a second reverse osmosis unit that lies downstream of the first reverse osmosis unit.

4. The method of claim 1, further comprising discharging solute from the first reverse osmosis unit to the effluent stream at a point upstream of the first heat exchanger.

5. The method of claim 3, further comprising recirculating a solute from the second reverse osmosis unit to the distillate stream at a point upstream of the first reverse osmosis unit.

6. The method of claim 1, further comprising using water that has a purity of greater than 95% as make up water in a carbon capture plant or for a power plant.

7. The method of claim 1, further comprising co-incinerating a concentrate derived from the concentrate stream in a boiler.

8. The method of claim 1, further comprising dosing the distillate stream upstream of the first reverse osmosis unit.

9. A system comprising:
   an evaporation unit, the evaporation unit comprising a first heat exchanger, a second heat exchanger, a water separator and a compressor; wherein
   the first heat exchanger is in fluid communication with the second heat exchanger and is operative to heat an effluent stream comprising an amine solvent or byproducts of the amine solvent and water and to discharge the effluent stream to the second heat exchanger; and
   wherein the second heat exchanger is in fluid communication with the water separator and compressor;
   and wherein the evaporation unit is operative to convert the effluent stream into a distillate stream and a concentrate stream; and
   a reverse osmosis unit in fluid communication with the evaporation unit; where the reverse osmosis unit comprises a first reverse osmosis unit that is operative to receive the distillate stream and to separate water from byproducts of the amine solvent such that the water has a purity of greater than 95%, based on the weight of the distillate stream.

10. The system of claim 9, where the water separator is operative to separate water vapor from liquid water and provide the water vapor to the compressor recirculate the liquid water back to the second heat exchanger.

11. The system of claim 9, where the first heat exchanger is feed/distillate heat exchanger.

12. The system of claim 9, where the second heat exchanger is a shell and tube heat exchanger.

13. The system of claim 9, where the reverse osmosis unit further comprises a second reverse osmosis unit in fluid communication with the first reverse osmosis unit.

14. The system of claim 9, where the reverse osmosis unit is a multi-array double pass reverse osmosis unit.

15. The system of claim 9, further comprising a concentrate storage tank that lies downstream of the evaporation unit and is operative to receive the concentrate stream from the evaporation unit.

16. The system of claim 9, where the water has a purity of greater than 99%, based on the weight of the distillate stream.

17. The system of claim 9, where the water having a purity of greater than 95% is used as make up water in a carbon capture plant or for a power plant.

18. The system of claim 9, where a concentrate derived from the concentrate stream is co-incinerated in a boiler.

19. The system of claim 9, where no waste streams are emitted to the environment.

20. The system of claim 9, an acid dosing system in fluid communication with the evaporation unit and the reverse osmosis unit; the acid dosing system being operative to form salts from residual ammonia and volatile amines in the distillate stream.

* * * * *